UNITED STATES PATENT OFFICE.

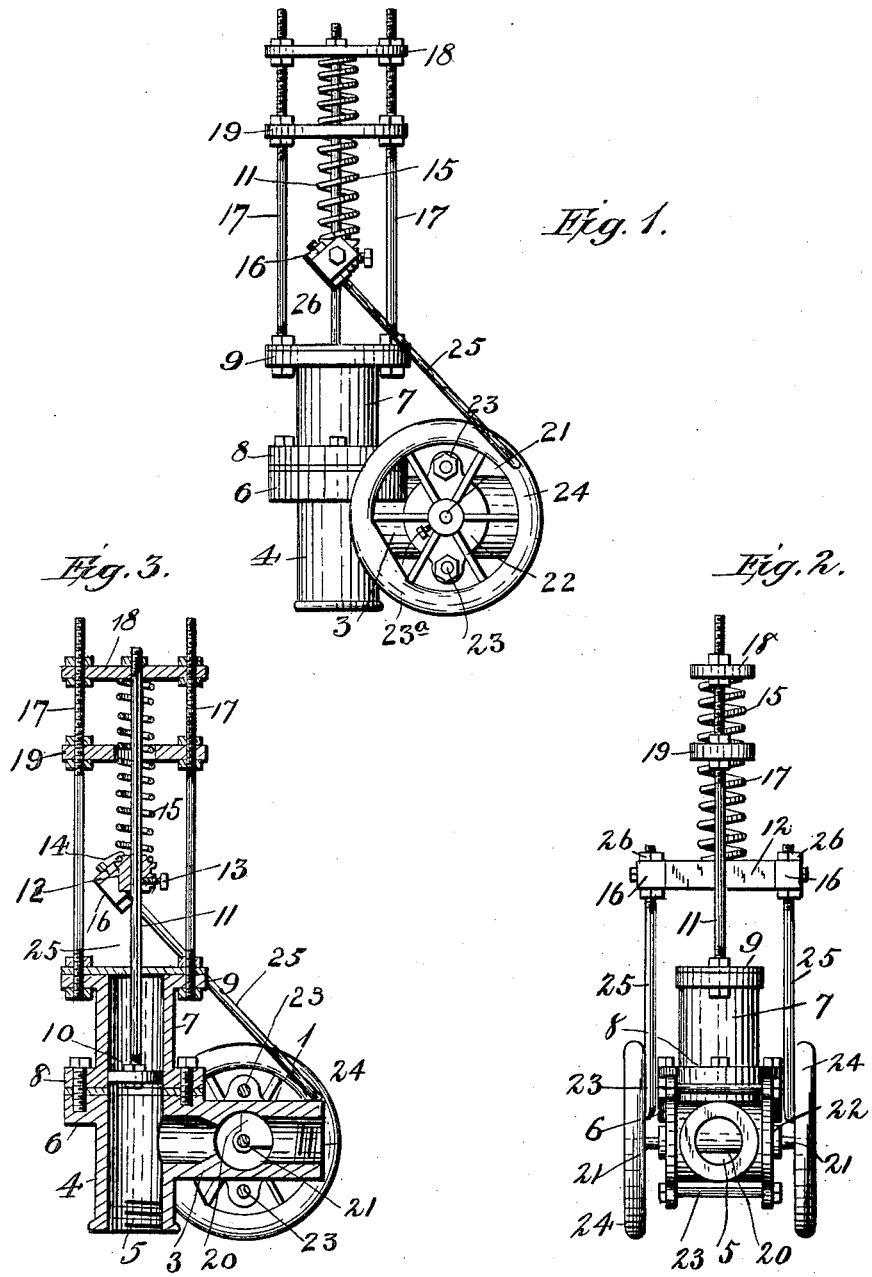

DANIEL GRIFFITH, OF WEXFORD, MICHIGAN.

STEAM-ENGINE GOVERNOR.

SPECIFICATION forming part of Letters Patent No. 657,869, dated September 11, 1900.

Application filed February 26, 1900. Serial No. 6,606. (No model.)

*To all whom it may concern:*

Be it known that I, DANIEL GRIFFITH, a citizen of the United States, residing at Wexford, in the county of Wexford and State of Michigan, have invented new and useful Improvements in Steam-Engine Governors, of which the following is a specification.

My invention relates to pressure-regulators for steam-engines; and the objects of the same are to provide an improved valve and simple and efficient means for operating the same to automatically regulate the amount of steam admitted to the engine, depending upon the power required to be exerted.

The invention consists of the novel construction and combination of parts hereinafter fully described and claimed.

In the accompanying drawings, which form a part of this specification, Figure 1 is a side elevation of an engine-governor constructed in accordance with my invention. Fig. 2 is an end elevation of the same. Fig. 3 is a central longitudinal section of the same.

In the drawings like numerals of reference denote like parts wherever they occur.

In said drawings, 1 is a cylindrical valve-casing, with threaded connection integral therewith adapted to be connected to an ordinary steam-boiler. (Not shown.) A connection consisting of cylinders 3 and 4 and a threaded portion 5 is connected to or is integral with valve-casing 1. Portion 5 is adapted to make connection with an engine-cylinder of ordinary construction, which is not shown. Cylinder 4 has an extending flange 6 integral therewith and provided with holes for bolts. Bolted to cylinder 4 is a cylinder 7, provided with a flange 8 and projecting lugs 9. Fitting in cylinder 7 is an ordinary piston 10, and secured thereto is a piston-rod 11, which extends upwardly, passing through the cylinder-head and through cross-head 12 and traverses the length of the spring. Cross-head 12 is fitted with a set-screw 13, which enables said cross-head to be clamped in any position on the piston-rod. It is also provided with a lug 14, integral therewith, to serve as an attachment for spring 15, and an apertured portion or block 16, pivotally attached to each end. Vertical threaded rods 17 are secured to lugs 9. They extend upwardly and provide supports for cross-head 18, which provides an attachment for the upper end of spring 15 and, in combination with cross-head 12, confine the same. A third cross-head 19, perforated and placed intermediate cross-heads 12 and 18, is supported by rods 17 and more rigidly confines the spring 15.

Seated in the valve-casing 1 is a rotary valve, consisting of a segment of a cylinder 20, keyed to a shaft 21. Said shaft extends each way through the cylinder-heads 22 and is journaled therein. Said cylinder-heads are secured and tied together by rods 23. Secured by set-screws 23ª to each end of shaft 21 are wheels 24, which serve as levers for operating the valve or as hand-wheels, and also act as balance-wheels. Pivotally attached to the rims of said wheels are connecting-rods 25, which extend upwardly and pass through the apertures in blocks 16. These rods are screw-threaded at their upper ends and are fitted with nuts 26 for adjusting purposes.

The operation of my device is as follows: The rotary valve is adjusted by means of nuts 26 and set-screws 23 so as to allow a certain quantity of steam to be supplied to the engine-cylinder. When the work of the engine is increased, the pressure in the cylinder will rise, which will cause the piston to be correspondingly raised. This will open the rotary valve, thereby increasing the amount of steam supplied to the cylinder. When the pressure in the cylinder is reduced, the spring will react automatically and close the rotary valve more or less, thus reducing the amount of steam supplied.

It will be obvious from the foregoing that by my invention just the required amount of steam is automatically admitted to the cylinder to meet varying conditions and that the device is simple in construction, of comparatively few parts, which are not liable to get out of order, is reliable and efficient in use, and may be manufactured at slight cost.

Having thus fully described my invention, what I claim as new, and wish to secure by Letters Patent, is—

1. In a steam-engine governor, the combination with the valve-casing adapted to be connected with a steam-boiler, the coupling secured thereto and adapted to be connected with a steam-engine cylinder, the cylinder connected to said coupling, the piston located therein, the piston-rod and the coiled spring, of the cross-head secured to said piston-rod, the connecting-rods pivotally connected therewith, the wheels to which said rods are pivotally connected, the shaft connected therewith, and the rotary valve secured to said shaft and seated in said valve-casing, substantially as described.

2. In a steam-engine governor the combination of a valve-casing adapted to be connected with a steam-boiler, a cylinder connected to said valve-casing and adapted to be connected with a steam-engine cylinder, a piston located in said cylinder, a piston-rod fitted in said piston, a coiled spring surrounding the upper end of said piston-rod, a cross-head secured to said piston-rod, a rotary valve seated in said valve-casing, and means for connecting said rotary valve with said cross-head, substantially as described.

In testimony whereof I have hereunto set my hand in presence of two subscribing witnesses.

DANIEL GRIFFITH.

Witnesses:
MYRTLE WALKER,
F. R. WALKER.